United States Patent [19]
Ratliff, Jr.

[11] 3,850,505
[45] Nov. 26, 1974

[54] UNIVERSAL STEREOSCOPIC VIEWING DEVICE

[75] Inventor: Harvey L. Ratliff, Jr., Amarillo, Tex.

[73] Assignee: Jetru Inc., Amarillo, Tex.

[22] Filed: Mar. 15, 1973

[21] Appl. No.: 341,482

[52] U.S. Cl.............. 350/133, 40/63 A, 350/134, 350/140, 350/143
[51] Int. Cl. .......................................... G02b 27/22
[58] Field of Search .......... 350/133, 134, 140, 143; 40/63 A

[56] References Cited
UNITED STATES PATENTS
3,005,378  10/1961  Golden .............................. 350/140
3,145,253  8/1964  Patton ................................. 350/140

Primary Examiner—Paul A. Sacher

[57] ABSTRACT

A universal stereoscopic viewing device for use with all the major stereoscopic formats including panoramic formats of 2.07 inch by 0.92 inch or commonly used small formats of 0.45 inch by 0.40 inch, which device has lenses having a "K" property that introduces no distortion when the lenses are used with the common small formats (0.45 × 0.40) and is distortion-free at panoramic angles of view when matched to panoramic slides of the large formats with a reverse "-K" value of the same magnitude.

11 Claims, 3 Drawing Figures

PATENTED NOV 26 1974 3,850,505

UNIVERSAL STEREOSCOPIC VIEWING DEVICE

BACKGROUND OF THE INVENTION

The prior art is replete with stereoscopic viewing devices. There are systems such as the "View-Master" system which have been around a long period of time and for which untold numbers of people have large supplies of disc-type slides on file. Many people also have 35 millimeter slides of their own taken with stereo cameras such as the "Stereo Realist" camera. Stereoscopic transparencies are also common on 35 millimeter and 16mm or "split 35" millimeter film strips. Recently there have been developments in wide-angle or panoramic stereoscopy which could readily be used with 35 millimeter and 16 mm or "split 35" millimeter film strips. Stereoscopy would be much more useful for instructional and entertaining purposes if it were available in all its formats, i.e., the disc format, the 35 mm slide mount format, or the 35mm, 16mm or split 35mm filmstrip format. It would especially be much more useful for these purposes if it were available in all these formats for a very low price, and if it were very rugged and long lasting. Shipment costs are one of the things which drive up the costs of any item. It is thereforoe very desirable to have an item which can be easily and inexpensively shipped.

SUMMARY OF THE INVENTION

It is therefore the principal object of the invention to teach a viewer which can be used with a multiplicity of stereoscopic formats, i.e., the "View-Master" format, the 35mm card mounted formats, the 35mm filmstrip formats with regular angles of view or panoramic angles of view, or the 16mm or split 35mm formats with regular angles of view or panoramic angles of view. It is a further object to teach a viewer which is very inexpensive to manufacture, rugged and long lasting. It is still a further object of the invention to teach a viewer which can be shipped in a flat unfolded form very easily and inexpensively. It is still a further object to teach a viewer using lenses having a "K" property which will not introduce distortion when used to view regular narrow angle slides such as "View-Master" or "Stereo Realist" slides and which will not result in distortion when used to view panoramic stereoscopic slides of the type taken with a camera such as disclosed in my U.S. Pat. No. 3,608,458.

DETAILED DESCRIPTION

Figures 1, 2, 3:
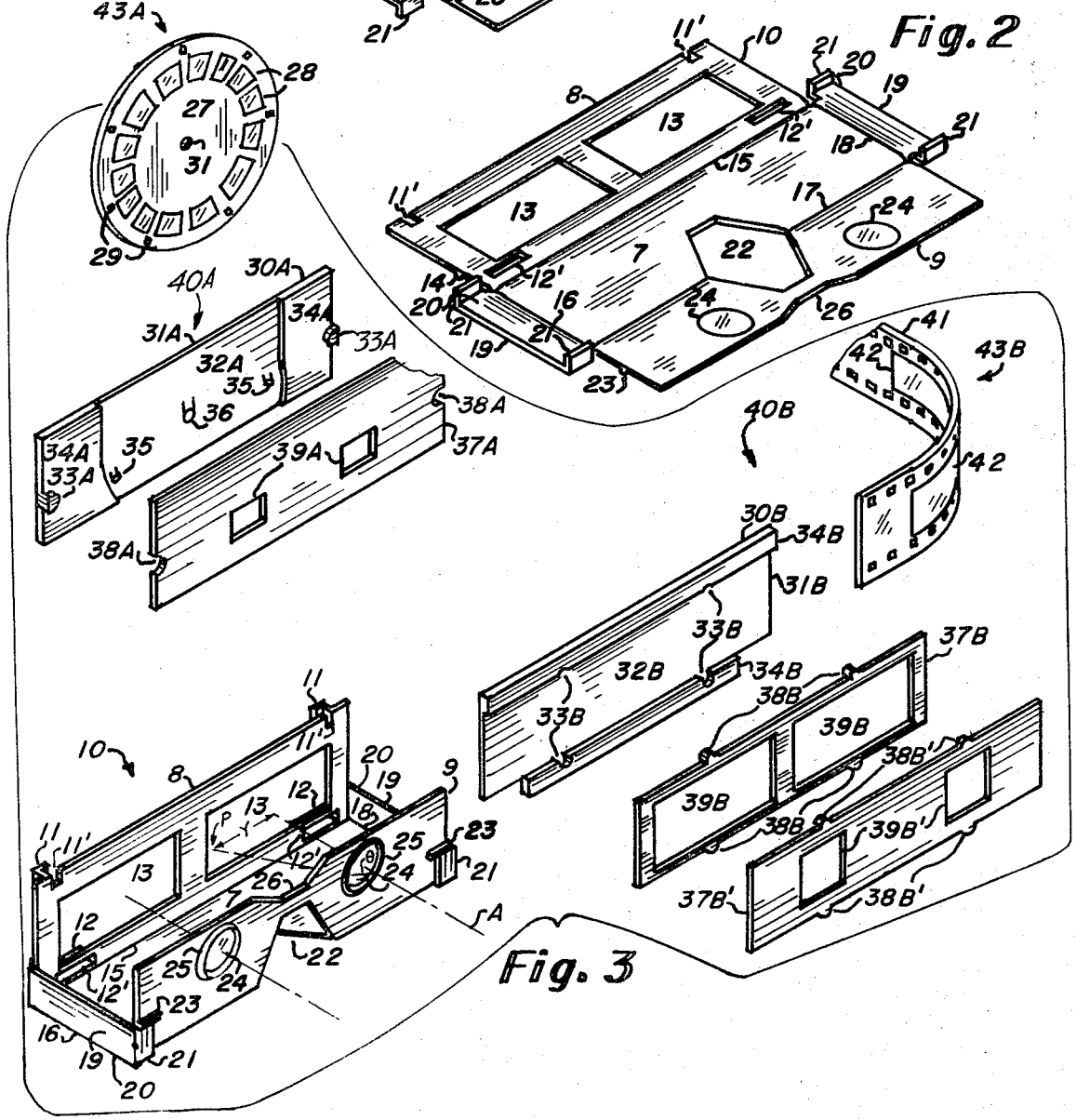
FIG. 1 is an isometric drawing showing the bottom of the invention in its most contemplated form in its unfolded position, looking from its right rear.
FIG. 2 is an isometric drawing showing the top of the device of FIG. 1 in its unfolded position, looking from its left rear.
FIG. 3 is an isometric drawing showing the top of the device of FIG. 1 in its folded viewing position from its left rear and an exploded view of apparatus with which the invention is to be used.

A more detailed description will now be given of the invention which is a universal steroscopic viewing device 10 that is for use with a multiplicity of differently dimensioned transparency slide holders 40, i.e., 40A and 40B of FIG. 3, for holding a multiplicity of differently dimensioned stereoscopic transparencies 43, i.e., 43A and 43B of FIG. 3. Each of the slide holders 40, i.e., 40A and 40B of FIG. 3, has a white translucent back portion 30, i.e., 30A and 30B of FIG. 3, and an opaque front portion 37, i.e., 37A, 37B, and 37B' of FIG. 3. The front and back portions have positioning elements 33 and 38, i.e., 33A, 38A and 33B, 38B, 38B' of FIG. 3, for holding the front portion 37 (37A, 37B, or 37B') in abutment with the back portion 30 (30A or 30B respectively). Each of the front portions 37A, B or B' have first stereoscopically coupled apertures 39A, B, or B' respectively for framing the two views of a stereoscopic transparency 43A or B respectively positioned between the front portion 37A, B, or B' and the back portion 30A or B respectively. The back portion 30A or B has a thin flat part 31A or B respectively for providing diffuse light behind the stereoscopic transparency 43A or B respectively and a thick flat part 34A or B for providing a transverse slot 32A or B respectively between the thin flat part 31A or B respectively and the front portion 37A, B, or B' respectively to hold the stereoscopic transparency 43A or B respectively with its two views 28 or 42 respectively framed in front of the thin part 31A or B respectively and behind the apertures 39A, B, or B' respectively when the positioning elements 33A or B and 38A, B, or B' respectively hold the front portion 37A, B, or B' respectively in abutment with the back portion 30A or B respectively.

The universal stereoscopic viewing device 10, itself comprises an advanced portion 8, a rear portion 9, two lateral portions 20, and a central portion 7. There are folding depressions 15, 16, 17, and 18 separating the advanced portion 8, rear portion 9, and two lateral portions 20 respectively from the central portion 7. The rear portion 9 is foldable along the folding depression 17 separating it from the central portion 7 into a viewing position, see FIG. 3, perpendicular to the central portion 7 and has snaps 23 and a pair of stereoscopically coupled lenses 24 which each produce the relation $K \cong \theta/Y$ over wide angles of view where $\theta$ is the angle a ray entering the eye of an observer makes with the optical axis A of the lens 24 (see the right lens of FIG. 3), $Y$ is the distance from the optical center of the object plane of the lens 24 to the point of origin P of said ray measured along a line perpendicular to the optical axis A and passing through said optical center, and $K$ is a predetermined property of the lens which has a predetermined value that is substantially constant throughout wide-angle values of $\theta$. The advanced portion 8 has retaining snaps 14, second stereoscopically coupled apertures 13 which allow $Y$ values large enough for wide-angle $\theta$ values (for example $Y$ values of 1.036 inch for horizontal aperture widths of 2.072 inch), and means 11 and 12 for receiving and retaining one of the transparency slide holders 40A or B with the optical centers coinciding in the first apertures 39A, B, or B' and the second apertures 13. The advance portion 8 is foldable along the folding depression 15 separating it from the central portion 7 into a viewing position (see FIG. 3) that puts a stereoscopic transparency 43A or B at the object plane of the lenses 24 when the transparency 43A or B is in one of the slide holders 40A or B respectively which is retained in the names 11 and 12. The two lateral portions 20 are foldable along the folding depressions 16 and 18 respectively separating them from said central portion 7 into positions (see FIG. 3) perpendicular to the central portion 7 and have ribs 19 (to rigidly hold portions 8 and 9 in the proper viewing position when they are folded) and snaps 21 for holding the advanced portion 8 and the rear portion 9 in the folded viewing position when the snaps 21 of the lateral portions 20 are snapped under the snaps 14 and 23 respectively of the advanced portion 8 and rear portion 9.

The folding depressions 15, 16, 17, and 18 are relatively thin, of the order of 0.020 inch, while the portions 7, 8, 9, and 20 are thicker, of the order of 0.050 inch. The device 10 can be molded out of well known resilient transparent material or the lenses 24 can be separately molded out of transparent optical plastic such as acrylic and the remainder of device 10 molded out of well known resiliant opaque plastic such as nylon with retainers 25 fastening lenses 24 to portion 9. Apertures 11' and 12' are not critical to the invention and are merely to allow device 10 to be molded while device 10 is in the flat unfolded position for convenient shipment, in certain kinds of molds.

The transparency slide holder 40A as shown in FIG. 3 is specifically dimensioned for holding the well known disc-type "View-Master" mounted slides. The cavity 32A has a width only a few thousandths of an inch greater than the diameter of mounted slide 43A as shown in FIG. 3 so that when posts 33A are slipped into apertures 38A and holder 40A is slipped through means 11 and bottomed into means 12, the slide 43A may be slipped into cavity 32A and held into position by retaining elements 35 and 36. Element 36 presses against disc 27 until it is centered with element 36 fitting into aperture 31. Once disc 27 is centered with element 36 in aperture 31, it is rotated by hand or obvious mechanical means until elements 35 are in the respective apertures 29 so that a stereoscopic-pair of pictures are optically centered behind apertures 39A. The shoulders separating thin parts 31A from thick part 34A have a radius of curvature approximately equal to that of disc 27 in the bottom portion of slot 32A so that disc 27 is adequately centered and will not fall through slot 32A.

From the foregoing disclosure it is obvious to also dimension slide holder 40A for receiving and retaining a "Stereo Realist" mounted slide as well as the "View-Master" mounted slide specifically described or, after further reading the disclosure hereinafter, panoramic stereo mounted slides.

The transparency slide holder 40B as shown in FIG. 3 is specifically dimensioned in four different most contemplated ways. In one way the height of slot 32B is approximately equal (but a few thousanths of an inch greater than) the width of a 35 millimeter filmstrip. The height slot is for a front portion 37B having panoramic apertures 39B, for example 2.072 inch by 0.923 inch in dimension which is for use with a filmstrip 43B which has stereo frames 42 of a corresponding dimension. In this situation frames 42 were taken with a camera such as described in my U.S. Pat. No. 3,608,458, and have the "K" property described therein which matches the "K" whereby the user sees no distortion when looking into lenses 24 at these frames 42. This first height slot is also for a front portion B' having standard 35mm stereoscopic apertures 39B' corresponding to standard stereoscopic frames 42 such as those produced when the 35mm film strip of a "Stereo Realist" camera is developed but not placed on cardboard mounts, or for the viewer under U.S. Pat. No. 2,789,460.

In a second set of ways, the height of slot 32B is approximately equal (but a few thousanths of an inch greater than) the width of a 16mm or split 35mm filmstrip. This height slot is for a front portion 37B having panoramic apertures 39B, for example 2.072 inch by 0.530 inch on split 35mm which is for use with a split 35mm film strip 43B which has stereo frames 42 of a corresponding dimension. In this situation also frames 42 were taken with a camera of said U.S. Pat. No. 3,608,458, in the manner as described hereinabove. The height slot for the second set of ways is also for a front portion B' having small apertures 39B' dimensioned as apertures 39A for frames 42 which are approximately the same size as "View-Master" or as the frames of the stereo slides manufactured by Visual Data Corporation.

The means 11 and 12 for receiving and retaining the transparency slide holders represented by 40A and B are comprised of lateral plates 11a, bottom plates 12b, and back plates 11b and 12a. The lateral plates 11a retain a slide holder represented by 40A or B from lateral motion and the back plates 11b and 12a retain the holder 40A or B clamped to the remaining part of portion 8. Both lateral plates 11a and back plates 11b and 12a guide holder 40A or B toward its bottoming position where it rests on bottom plates 12b. The distance between lateral plates 11a is sufficient to allow panoramic apertures such as 39B to be used in a holder 40A or B behind panoramic apertures 13.

Aperture 22, partly in portion 7 and partly in portion 9 is provided for the nose of a user and cut-away 26 in portion 9 is provided so that lenses 24 can be placed behind the brow of the user for panoramic or wide-angle viewing.

While the invention has been disclosed and described in some detail in the drawings and foregoing description, they are to be considered as illustrative and not restrictive in character, as other modifications may readily suggest themselves to persons skilled in the art and within the broad scope of the invention, reference being had to the appended claims.

I claim:

1. A stereoscopic viewing device for use with differently dimensioned transparency slide holders for holding differently dimensioned stereoscopic transparencies, each of said slide holders having a white translucent back portion and an opaque front portion with said front and back portions having positioning elements for holding said front portion in abutment with said back portion, with said front portion having first stereoscopically coupled apertures for framing the two views of a stereoscopic transparency positioned between the front and back portions, and with said back portion having a thin flat part for providing diffuse light behind said stereoscopic transparency and a thick flat part for providing a transverse slot between said thin flat part and said front portion to hold said stereoscopic transparency with said two views framed in front of said thin part and behind said apertures when said positioning elements hold said front portion in abutment with said back portion, said stereoscopic viewing device comprising:

an advanced portion, a rear portion, two lateral portions, and a central portion, folding depressions separating said advanced, rear, and two lateral portions from said central portion, said rear portion being foldable along the folding depression separating it from said central portion into a viewing position making a fixed angle with said central portion and having retaining snaps and a pair of stereoscopically coupled lenses which each produce the relation $K \cong \theta/Y$ over wide angles of view where $\theta$ is the angle a ray entering the eye of an observer makes with the optical axis of the lens, $Y$ is the distance from the optical center of the object plane of said lens to the point of origin of said ray measured along a line perpendicular to said optical axis and passing through said optical center, and $K$ is a predetermined property of the lens which has a predetermined value that is substantially constant throughout wide-angle values of $\theta$, said advanced portion having retaining snaps, second stereoscopically coupled apertures which allow $Y$ values large enough for wide-angle $\theta$ values, and means for receiving and retaining any one of said slide holders with the optical centers coinciding in said first and second apertures and being foldable along the folding depression separating it from said central portion into a viewing position that puts said stereoscopic transparency at the object plane of said lenses when said transparency is in one of said slide holders which is retained by said means, and said two lateral portions being foldable along the folding depressions separating them from said central portion into positions perpendicular to said central portion and having ribs and snaps for holding said advanced and rear portions in the folded viewing position when said snaps of said lateral portions are snapped under the snaps of said advanced and rear portions.

2. The device of claim 1 wherein said means for receiving and retaining said transparency slide holder is comprised of lateral plates, bottom plates, and back plates, the lateral plates are for retaining said slide holder from lateral motion and the back plates are for retaining said slide holder against the remaining part of said advanced portion, both said lateral plates and said back plates are for guiding said slide holder toward its bottoming position where it rests against said bottom plates, the distance between the lateral plates being sufficient to allow as apertures to be of panoramic dimensions.

3. A stereoscopic viewing device for use with differently dimensioned transparency slide holders for holding differently dimensioned stereoscopic transparencies, each of said slide holders having a white translucent back portion and an opaque front portion with said front and back portions having positioning elements for holding said front portion in abutment with said back portion, with said front portion having first stereoscopically coupled apertures for framing the two views of a stereoscopic transparency positioned between the front and back portions, and with said back portion having a thin flat part for providing diffuse light behind said stereoscopic transparency and a thick flat part for providing a transverse slot between said thin flat part and said front portion to hold said stereoscopic transparency with said two views framed in front of said thin part and behind said apertures when said positioning elements hold said front portion in abutment with said back portion, said stereoscopic viewing device comprising:

an advanced portion, a rear portion, two lateral portions, and a central portion, said rear portion being in a viewing position making a fixed angle with said central portion and having a pair of stereoscopically coupled lenses which each produce the relation $K \cong \theta/Y$ over wide angles of view where $\theta$ is the angle a ray entering the eye of an observer makes with the optical axis of the lens, $Y$ is the distance from the optical center of the object plane of said lens to the point of origin of said ray measured along a line perpendicular to said optical axis and passing through said optical center, and $K$ is a predetermined property of the lens which has a predetermined value which is substantially constant throughout wide-angle values of $\theta$, said advanced portion having second stereoscopically coupled apertures which allow $Y$ values large enough for wide-angle $\theta$ values, and means for receiving and retaining any one of said slide holders with the optical centers matching in said first and second apertures and being in a viewing position that puts said stereoscopic transparency at the object plane of said lenses when said transparency is in one of said slide holders which is retained by said means, and said two lateral portions holding said advanced and rear portions in the viewing position.

4. The device of claim 3 wherein one of said slide holders is dimensioned for top reception and retention of a stereoscopic transparency which comprises a mount made of stiff material supporting a film material which contains the the stereoscopic image frames.

5. The device of claim 4 wherein said mount is disc-shaped and rotatable about a central pivot aperture with the film frames positioned radially about said pivot aperture such that the corresponding stereo-frames have their optical centers approximately the interpupillary distance apart and when the disc shaped mount is in the holder retained in said means of said viewing device the corresponding stereo-frames may be successively rotated and viewed through said lenses with their optical centers on the optical axes of said lenses.

6. The device of claim 3 wherein one of said slide holders is dimensioned for lateral reception and retention of a stereoscopic transparency which comprises a 35 millimeter film strip having stereoscopically coupled picture frames exposed and developed thereupon.

7. The device of claim 3 wherein one of said slide holders is dimensioned for lateral reception and retention of a stereoscopic transparency which comprises a 16 millimeter film strip having stereoscopically coupled picture frames exposed and developed thereupon.

8. The device of claim 6 wherein the holder is dimensioned for frames which are 2.072 inch wide.

9. The device of claim 7 wherein the holder is dimensioned for frames which are 2.072 inch wide.

10. The device of claim 8 wherein said second stereoscopically coupled apertures are for horizontal $Y$ values of 1.036 inch.

11. The device of claim 9 wherein said second stereoscopically coupled apertures are for horizontal $Y$ values of 1.036 inch.

* * * * *